United States Patent

(12) United States Patent
Geisler

(10) Patent No.: US 11,020,871 B2
(45) Date of Patent: Jun. 1, 2021

(54) METHOD FOR MAKING A BLIND HOLE

(71) Applicants: Wolfgang Rixen, Solingen (DE);
Gerrit Pies, Solingen (DE)

(72) Inventor: Tobias Geisler, Sprochoevel (DE)

(73) Assignees: Wolfgang Rixen; Gerrit Pies

(*) Notice: Subject to any disclaimer, the term of this patent is extended or adjusted under 35 U.S.C. 154(b) by 295 days.

(21) Appl. No.: 16/103,917

(22) Filed: Aug. 14, 2018

(65) Prior Publication Data
US 2019/0054647 A1 Feb. 21, 2019

(30) Foreign Application Priority Data

Aug. 15, 2017 (DE) .......................... 102017214210.3

(51) Int. Cl.
*B21D 28/24* (2006.01)
*B26F 1/14* (2006.01)
*B21K 23/00* (2006.01)
*B21K 1/64* (2006.01)
*F16B 37/04* (2006.01)

(52) U.S. Cl.
CPC ................. *B26F 1/14* (2013.01); *B21D 28/24* (2013.01); *B21K 1/64* (2013.01); *B21K 23/00* (2013.01); *F16B 37/046* (2013.01)

(58) Field of Classification Search
CPC ... B21D 28/24; B21D 28/10; Y10T 29/49472; Y10T 29/49897; Y10T 29/5116
See application file for complete search history.

(56) References Cited

U.S. PATENT DOCUMENTS

| 4,177,665 A * | 12/1979 | Schurmann ............. B21C 23/01 72/355.6 |
| 5,502,994 A | 4/1996 | Katoh et al. |
| 6,145,365 A | 11/2000 | Miyahara |
| 9,261,148 B2 | 2/2016 | Hamasaki et al. |
| 2015/0367403 A1* | 12/2015 | Rixen ....................... B21K 1/64 72/332 |

FOREIGN PATENT DOCUMENTS

| EP | 2752594 A1 | 7/2014 |
| WO | 2014121899 A1 | 8/2014 |

OTHER PUBLICATIONS

European search report dated Jan. 11, 2019.

* cited by examiner

Primary Examiner — Jason L Vaughan
Assistant Examiner — Amanda Kreiling
(74) Attorney, Agent, or Firm — Fishman Stewart PLLC

(57) ABSTRACT

A method for making a blind hole may include arranging a workpiece in a negative form with a first portion and a second portion. The first portion may include a recess. The second portion may include a guide for a punch. The recess may be arranged substantially coaxially to the guide. The method may also include displacing a material of the workpiece into the recess via pressing the punch into the workpiece. Additionally, the method may include pressing the punch into the workpiece in a first movement section with a first velocity. The method may further include further pressing the punch into the workpiece in a second movement section with a second velocity such that the material is sheared and is partly extruded into the recess. The method may include moving the first portion relative to the second portion and shearing off the material displaced within the recess.

15 Claims, 4 Drawing Sheets

METHOD FOR MAKING A BLIND HOLE

CROSS-REFERENCE TO RELATED APPLICATIONS

This application claims priority to German Patent Application No. DE 10 2017 214 210.3, filed on Aug. 15, 2017, the contents of which are hereby incorporated by reference in its entirety.

TECHNICAL FIELD

The present invention relates to a method for making a blind hole in a metallic workpiece. The invention furthermore relates to a device for carrying out this method, as well as a groove block produced by this method and especially with the aid of the device.

BACKGROUND

From WO 2014/121899 A1 there is known a method of this kind for making a blind hole in a metallic workpiece, having at least one curved surface, wherein starting roughly from the horizontally oriented tangent to the curve and roughly transversely to this a portion of the material is displaced in the direction of the material of the workpiece by means of a stroke movement. First of all, the workpiece is provided with a female-type receptacle for the material being displaced and then the material of the workpiece is shoved by means of a punch in the axial direction of the receptacle, wherein the material encountered by the punch flows partly into the receptacle. After this, the material extending beyond the receptacle is removed.

SUMMARY

The present invention concerns itself with the problem of indicating an improved or at least an alternative embodiment for a method of this kind, one which is distinguished in particular by an improved quality of fabrication.

This problem is solved according to the invention by the subject matter of the independent claim(s). Advantageous embodiments are the subject matter of the dependent claim(s).

The present invention is based on the general idea of indicating a method for making a blind hole in which a high-speed shearing and a conventional shearing are employed in combination and in this way a significantly improved fabrication quality can be achieved. In the method according to the invention for making a blind hole in a metallic workpiece, especially one having at least one curved surface, first of all a negative form is provided, fashioned so as to be substantially at least partly complementary to the workpiece with a first portion and a second portion, wherein there is provided in the first portion of the negative form a recess arranged substantially coaxially to the blind hole being produced for material displaced during the making of the blind hole and in the second portion of the negative form a guide for a punch is provided, arranged substantially coaxially to the blind hole being produced. The punch herein has either a larger diameter than the recess, in which case a compacting of the material of the metallic workpiece occurs during the later shearing process in the region of an end-side margin of the recess, or the recess has an interior annular step at which the punch compacts the material of the metallic workpiece during the shearing process. First of all, however, the workpiece in which the blind hole is to be made is arranged in the negative form. The punch is then shoved, especially starting from the horizontally oriented tangent to the curve and roughly orthogonally to this, in the direction of the material of the workpiece by means of a pushing movement with displacement of a portion of the material into the workpiece, wherein the punch after a first contact with the workpiece is pressed into the workpiece in a first movement section $B_1$ with a first velocity $v_1$, so that the material encountered by the punch in the first movement section $B_1$ is sheared in an adiabatic state (high-speed shearing). After this, the punch is pressed further into the workpiece along a second movement section $B_2$ with a second velocity $v_2$ which is less than the first velocity $v_1$ so that the material encountered by the punch in the second movement section $B_2$ is sheared and compacted on an annular step formed by the different diameters of the recess (inner diameter) and the punch (outer diameter) or on the annular step in the recess and furthermore flows partly into the recess. Then, finally, the second portion of the negative form can still be moved relative to the first portion and this orthogonally to an axis of the blind hole and in this way the material of the workpiece displaced into the recess is sheared off, so that a blind hole remains in the workpiece. The depth of penetration $t_{1,2}$ of the punch in the first and second movement section $B_1$, $B_2$ herein is less than the overall height H of the workpiece, so that a blind hole bottom remains. Thanks to the two-stage shearing according to the invention with different velocities $v_1$, $v_2$, a clean parting surface with excellent surface evenness and furthermore with no relevant structural changes can be achieved on account of the relatively high velocity $v_1$ and the relatively short impulse in the first movement section $B_1$ of the punch. Thus, in the first movement section $B_1$ the material is sheared off and cannot flow away, which, if the velocity of the punch in the second movement section $B_2$ is not reduced, might result in destruction of the negative form. Thanks to the reducing of the punch velocity in the second movement section $B_2$ according to the invention, however, a flowing of the sheared-off material into the recess of the first portion of the negative form can be accomplished, so that a blind hole with extremely high surface quality can be created. Because of the impulse-like shearing of the material in the first movement section $B_1$ the heat produced here has no time to flow away into the rest of the workpiece or the punch. At the same time, in the first movement section $B_1$ of the punch a kind of cylinder is sheared off, which then in the second movement section $B_2$ of the punch is compacted at an end-side margin of the recess or at the annular step in the recess and at the same time extruded into it. The compacting region results basically from a difference between the outer diameter of the punch and the inner diameter of the recess in the first portion of the negative form or because of the annular step in the recess, through which the cylinder/slug that was sheared off adiabatically in the first movement section $B_1$ of the punch can partly flow away. Thanks to the shearing, furthermore, a spot welding can occur in the structure, so that the blind hole has an especially advantageous configuration due to its fabrication. The blind hole bottom herein is held or fixed on the one hand by the compression on the inside and on the other hand by the spot welding in the region of the shearing. It is of course clear herein that the metallic workpieces used need not necessarily have a curved surface, but rather may also naturally have other surfaces or cross sections.

In one advantageous modification to the solution of the invention, the punch in the first movement section $B_1$ is pressed into the workpiece by a depth $t_1$ of around 0.01 H≤$t_1$≤0.5 H. H here refers to the height of the workpiece.

The first movement section $B_1$, in which the high-speed shearing occurs, thus extends for only 1 to 50% of the height of the workpiece, preferably even less than 10% of the height H of the workpiece, so that the cylinder sheared off in the first movement section $B_1$ is shoved only slightly downward or compacted. This offers the special advantage that the punch is protected against excessive wear. Because the punch only penetrates as little as possible into the workpiece, only to bring about the adiabatic shearing, the punch can be protected against abrasion. The wear on the punch during the second movement section $B_2$ is substantially less, since the material is placed in a flowing state. Also especially positive here is the effect that the material around the punch is likewise placed in a flowing state.

In another advantageous embodiment of the solution of the invention, the punch in the first movement section $B_1$ is pressed into the material of the workpiece with a first velocity $v_1$ of ≥1 m/s, especially with a velocity $v_1$ between 6 m/s and 8 m/s, especially preferably with a velocity $v_1$ of around 7 m/s. It has been found herein that an adiabatic state and thus a high-speed shearing can already be achieved at these velocities.

In another advantageous embodiment of the solution of the invention, the punch in the second movement section $B_2$ is pressed into the workpiece with a second velocity $v_2$ of <0.15 m/s, especially with $v_2$≤0.005 m/s. Thus, in the second movement section $B_2$ there occurs a traditional shearing or an extrusion during which the separated cylinder is driven further through the workpiece at a significantly reduced second velocity $v_2$ of the punch and then extruded into the recess of the first portion of the negative form. In this process, the cylinder is at least partly braced by its radially external end face against a recess of smaller diameter of the first portion of the negative form or against an annular step in the recess. Thus, the material of the cylinder can be advantageously compacted in the region of this annular step, so that a subsequent shearing off of the protruding material is advantageously possible. The blind hole bottom is held or fixed herein on the one hand by the compression on the inside and on the other hand by the spot welding in the region of the shearing.

The present invention is further based on the general idea of indicating a device for carrying out the method described in the preceding paragraphs, wherein this device according to the invention comprises a negative form fashioned so as to be at least partly complementary to a workpiece being machined with a first portion and a second portion. Between the first and the second portion the workpiece being machined can be clamped while making the blind hole. There is provided in the first portion of the negative form a recess arranged substantially coaxially to a blind hole being produced for the material being displaced during the making of the blind hole, while in the second portion of the negative form a guide for a punch is provided, arranged substantially coaxially to the blind hole being produced. The punch of the device according to the invention is moved herein by means of a displacement device, the displacement device being designed such that it can move the punch in different movement sections $B_1$, $B_2$ with different infeed velocities $v_1$, $v_2$. In this way, it is possible to carry out the method according to the invention with two different movement velocities $v_1$, $v_2$ in two different movement sections $B_1$, $B_2$, wherein a high-speed shearing can occur in the first movement section $B_1$ by virtue of the higher first velocity $v_1$ of the punch there, while in the second movement section $B_2$ of the punch with the comparatively significantly lower second velocity $v_2$ a traditional shearing may occur. A diameter of the recess in the first portion of the negative form herein is smaller than a diameter of the punch, so that a kind of annular step is produced between the punch and the recess, resulting in a compacting and thus also in an internal welding of a later blind hole bottom. Alternatively, it is also conceivable for the diameter of the recess to be the same as a diameter of the punch, wherein in this case the recess has an annular step, which results in a compacting and thus also in an internal welding of a later blind hole bottom. The second portion of the negative form may furthermore be movable substantially orthogonally to a punch axis with respect to the first portion of the negative form, so that a shearing off of the material extruded by means of the punch into the recess can occur. Thus, with the aid of such a device, for the first time it is possible to make a blind hole by means of combined high-speed shearing and normal shearing with the benefits as described in the previous paragraphs.

In another advantageous embodiment of the device according to the invention, the punch has a diameter $D_S$ of around 3.5 to 4.5 mm, especially of around 4.1 mm. In addition or alternatively, the recess may have in the first portion of the negative form a diameter $D_A$ of around 3.6 mm, from which it is already evident that the punch according to the first embodiment of the recess has in any case a larger outer diameter than the inner diameter of the recess. Thanks to the larger punch as compared to the recess in terms of diameter, the compacting of the blind hole bottom can occur in an annular region in which the punch forces the material being displaced against an end-side margin of the smaller-diameter recess. In this way, a compression and also an internal welding can occur, in particular. The same holds for a recess in which an annular step is arranged.

Expediently, the first portion of the negative form is elastically mounted. Thanks to the elastic mounting of the first portion of the negative form, it is possible in particular for a part of the motion, applied in a pulsed manner, of the punch in the first movement section $B_1$ to be compensated, which in particular contributes to protecting the first portion of the negative form against damage which might occur if the first portion of the negative form were not elastically mounted, on account of the large impulse in the first movement section $B_1$.

The present invention further relates to the general idea of making a groove block by the aforementioned method, whereby such a groove block is given an extremely precise blind hole, which furthermore can be economically produced. Then, for example, a spring-loaded supporting element can be integrated in this blind hole. Of course, such a groove block may also have a through opening in addition, which is produced similarly by the method of the invention, but in this case the punch and the recess have the same diameter. By means of such a through opening, which can then be provided with an internal thread, it is possible to hold a screw for example for the fixation of the groove block.

Further important features and benefits of the invention will emerge from the dependent claims, from the drawings, and from the corresponding description of the figures with the aid of the drawings.

Of course, the aforementioned features and those yet to be explained below may be used not only in the particular indicated combination, but also in other combinations or standing alone, without leaving the scope of the present invention.

Preferred exemplary embodiments of the invention are represented in the drawings and shall be explained more closely in the following description, where the same reference numbers pertain to the same or similar or functionally identical parts.

BRIEF DESCRIPTION OF THE DRAWINGS

In the Figures

DETAILED DESCRIPTION

Figure 1A:
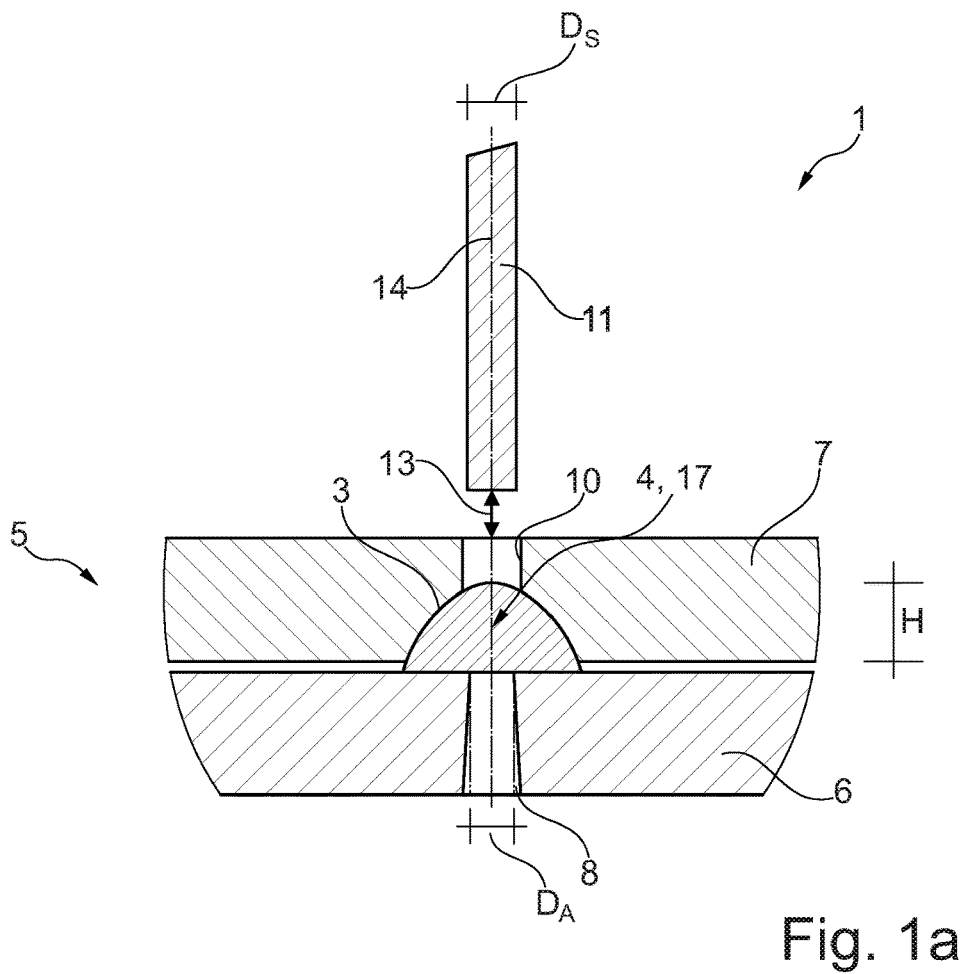
FIGS. 1a-1d schematically show various steps of the method for implementing a method according to the invention for making a blind hole, FIG. 2 schematically shows a velocity vs. time diagram to explain the method, FIG. 3 schematically shows a groove block made according to the method of the invention, FIG. 4 schematically shows a cross-sectional representation through a profile piece with a groove block made according to the invention, FIGS. 5a and 5b each schematically show a representation as in FIGS. 1a and 1b, but with a different recess in the first portion.
Figure 1B:
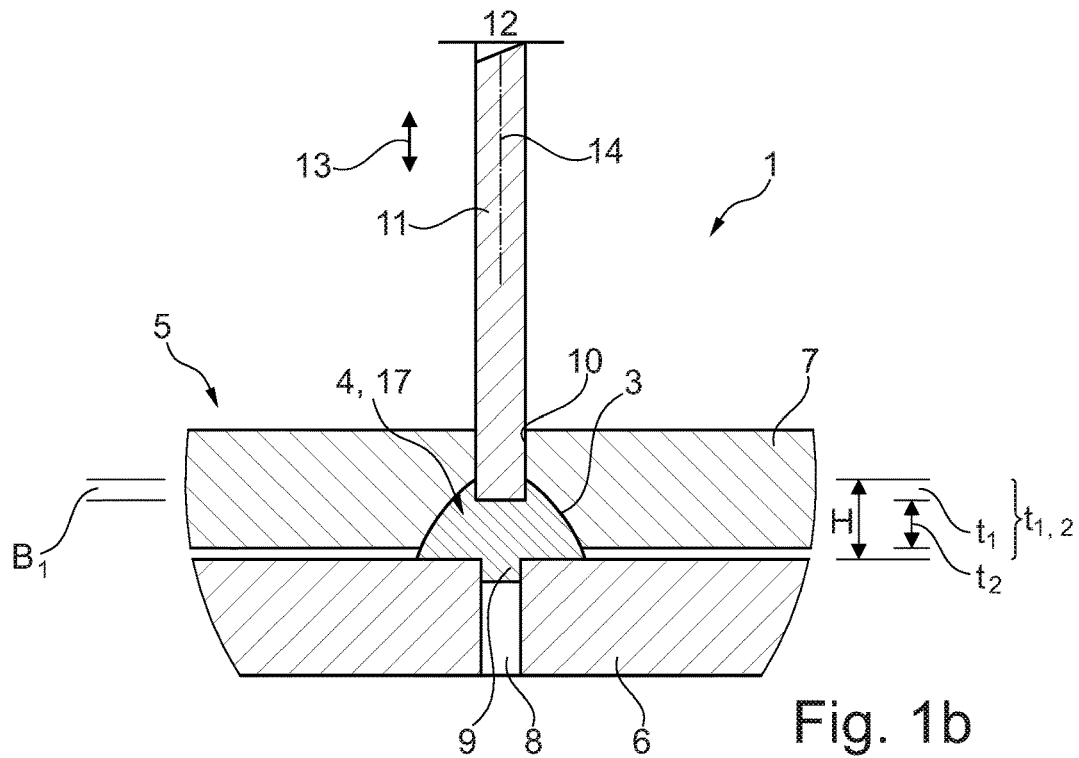

According to FIGS. 1a-d and 5a,b, a device 1 according to the invention for carrying out the method explained in the following paragraphs for making a blind hole 2 in a metallic workpiece 4, especially one having at least one curved surface 3, is shown. The device 1 according to the invention herein comprises a negative form 5 fashioned so as to be at least partly complementary to the workpiece 4 being machined with a first portion 6 (female die) and a second portion 7. There is provided in the first portion 6 of the negative form 5 a recess 8 arranged substantially coaxially to the blind hole 2 being produced for material 9 being displaced during the making of the blind hole 2 (see FIGS. 1b to 1d), the recess 8 preferably tapering conically in the direction of the workpiece 4 being machined, so that the material 9 extruded into the recess 8 after a shearing off can drop downward automatically. In the second portion 7 of the negative form 5 a guide 10 for a punch 11 (male die) is provided, arranged substantially coaxially to the blind hole 2 being produced. By means of a displacement device 12, which is shown only highly schematized in FIG. 1b, the punch 11 can be moved in the axial direction 13, that is, coaxially to the blind hole 2 being produced and to the guide 10, as well as to the recess 8, the displacement device 12 being furthermore designed such that it can move the punch 11 in different movement sections $B_1$ and $B_2$ with different velocities $v_1$ and $v_2$.

A diameter $D_A$ of the recess 8 in the first portion 6 of the negative form 5 herein according to FIGS. 1a-d is smaller than an outer diameter $D_S$ of the punch 11 at the location bordering on the workpiece 4 being machined (cf. FIG. 1a).

Figure 5A:
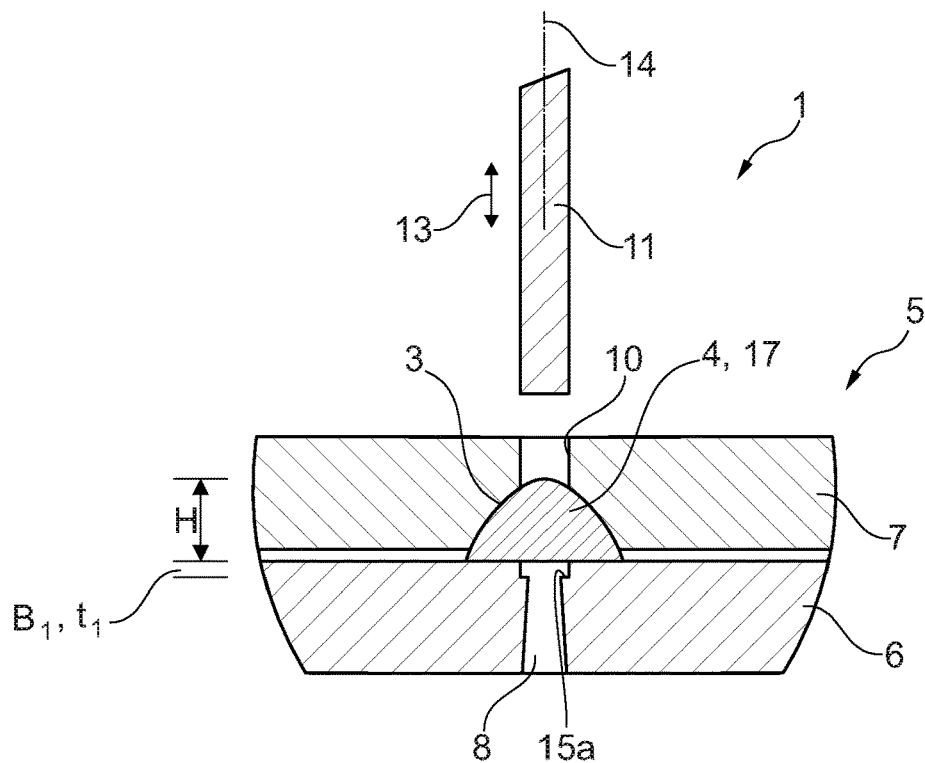
Figure 5B:
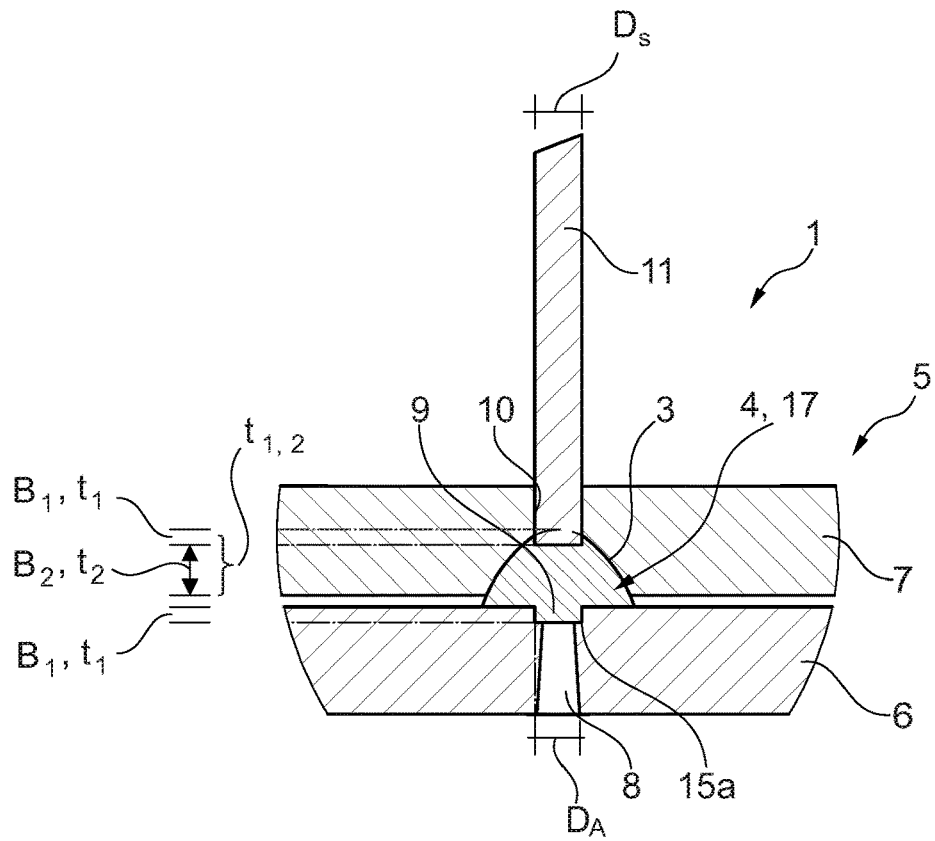

In FIGS. 5a, b, there is likewise provided in the first portion 6 of the negative form 5 a recess 8 arranged substantially coaxially to the blind hole 2 being produced for material 9 being displaced during the making of the blind hole 2 (see FIG. 5b), but it has an annular step 15a, so that a diameter $D_A$ changes abruptly in the region of the annular step 15a, being reduced abruptly in the downward direction. Beneath the annular step 15a shown in FIGS. 5a, 5b, the recess 8 preferably widens conically, so that in this case the material 9 extruded into the recess 8 does not drop down automatically after a shearing off, but instead is held at the annular step 15a. The (inner) diameter $D_A$ of the recess 8 in the first portion 6 above the annular step 15a may correspond herein to the outer diameter $D_S$ of the punch 11. On the lower side of the first portion 6 of the negative form 5 the diameter $D_A$ may also once more correspond to the diameter $D_S$ thanks to the conical widening. The depth $t_1$ of the recess 8 above the annular step 15a should correspond substantially to at least the depth $t_1$ of the first movement section $B_1$ (HGSS depth). It is likewise conceivable for the depth $t_1$ to be defined as $t_1+x$, where x corresponds to a control parameter at which the compression is supposed to begin. Thanks to this configuration, an elastic mounting of the first portion 6 of the negative form 5 can be omitted, since the material 9 which is expelled during the first movement section $B_1$ during the high-speed shearing with the first velocity $v_1$ would not impact on and destroy the female die, that is, the first portion 6. Thus, the depth $t_1$ up to the annular step 15a is preferably around $0.01\ H \leq t_1 \leq 0.5\ H$, preferably $t_1 \leq 0.1\ H$, where H stands for the overall height of the workpiece 4.

Figure 1C:
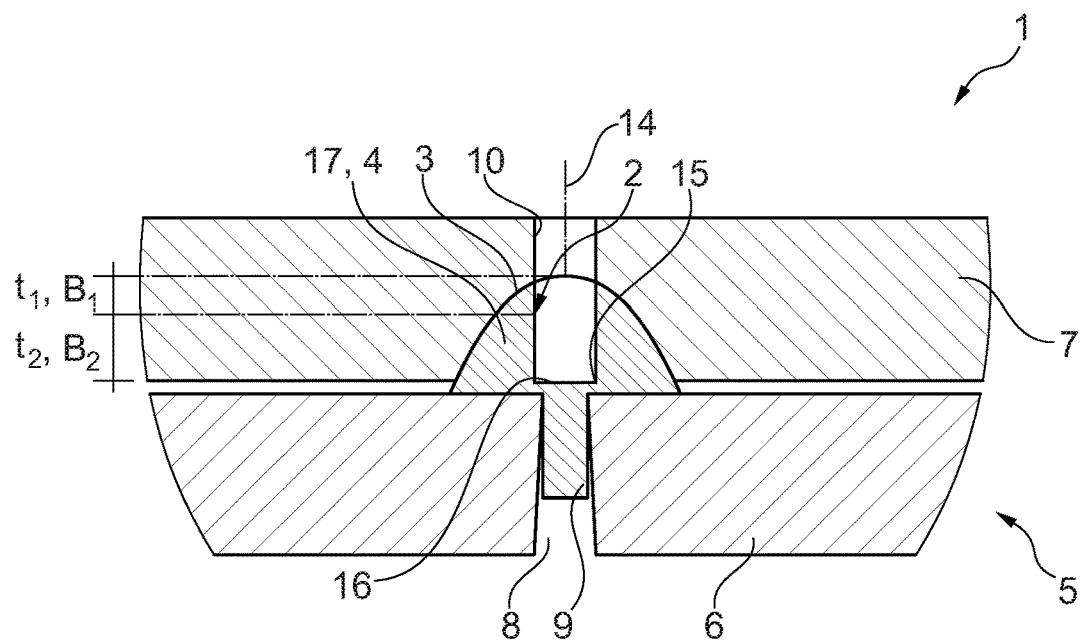
Figure 1D:
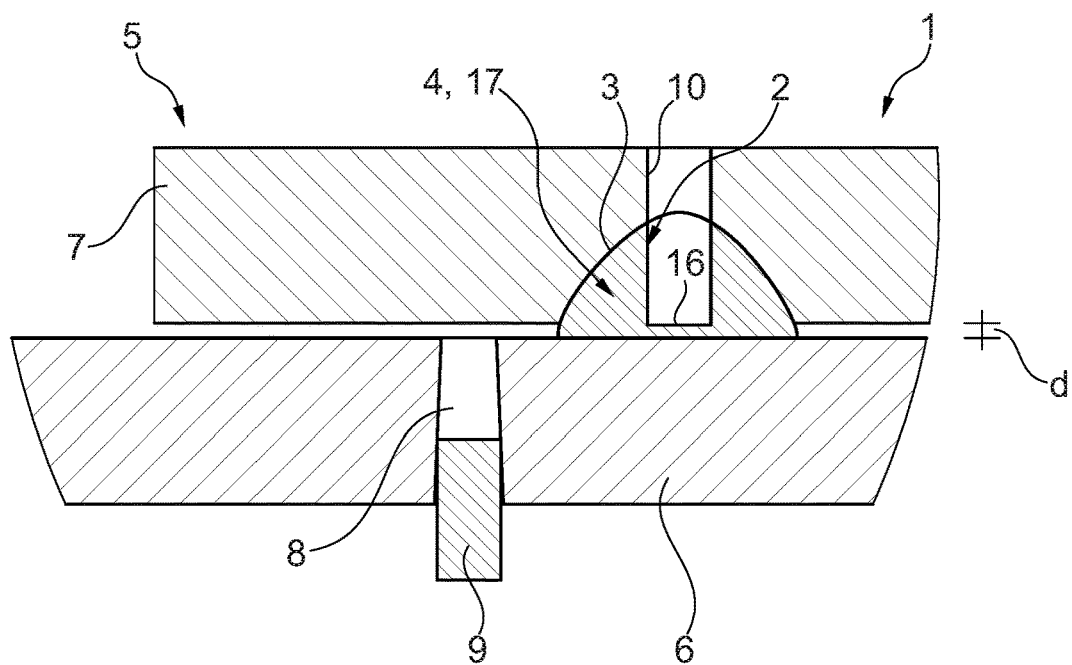

Furthermore, in the device 1 according to the invention the first portion 6 of the negative form 5 is movable substantially orthogonally to the axial direction 13, that is, with respect to the punch axis 14 here, relative to the second portion 7 of the negative form 5, so that a shearing off of the material 9 extruded into the recess 8 during the making of the blind hole 2 may occur, as is shown in FIG. 1d. Purely theoretically, it is also of course conceivable herein for the second portion 7 of the negative form 5 to be movable relative to the first portion 6 or for both portions 6, 7 to be movable relative to each other.

The method according to the invention for making the blind hole 2 functions as follows:

First of all, the negative form 5 with the first and second portion 6, 7 is provided and the workpiece 4 being machined is arranged therein, as shown by FIGS. 1a, 5a. After this, the punch 11 is moved by means of the displacement device 12 in the axial direction 13 toward the workpiece 4, wherein the punch 11 after a first contact with the workpiece 4 is pressed in a first movement section $B_1$ (also see FIG. 2) with a first velocity $v_1$ into the workpiece 4, where $v_1$ is so high that the material encountered by the punch 11 in the first movement section $B_1$ is sheared off in an adiabatic state. This condition is represented for example by FIGS. 1b, 5b. The first portion 6 of the negative form 5 is elastically mounted, especially in order to withstand the high impulse occurring during the first movement section $B_1$ without damage.

After this comes a further pressing of the punch 11 into the workpiece 4 in a second movement section $B_2$ with a second velocity $v_2$, which is smaller than the first velocity $v_1$, so that the material encountered by the punch 11 in the second movement section $B_2$ is sheared and at the same time compacted on an annular step 15 formed by the different diameters $D_A$ and $D_S$ of the recess 8 and the punch 11 (see FIG. 1c) or on the annular step 15a and furthermore is partly extruded into the recess 8. In FIG. 1c, the punch 11 is no longer shown, for better clarity.

In the optional succeeding step of the method, represented in FIG. 1d, a relative displacement occurs between the first portion 6 and the second portion 7 of the negative form 5 or vice versa, substantially orthogonally to the axial direction 13 or to the punch axis 14, which at the same time also represents a blind hole axis or a recess axis, and thus the material 9 displaced into the recess 8 is sheared off. After this, the workpiece 4 provided with the blind hole 2 according to the invention can be removed from the negative form 5.

Figure 2:
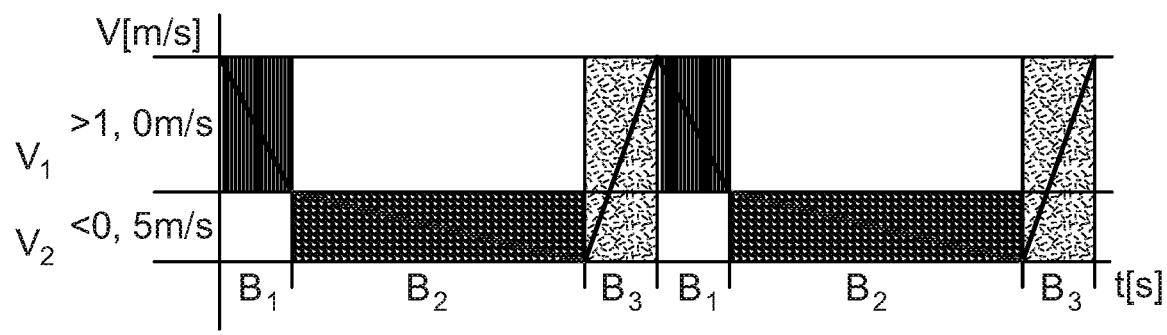

Considering FIG. 2, for example, one may recognize therein the individual movement sections $B_1$ and $B_2$ as well as the corresponding velocities v.

The punch 5 in the first movement section $B_1$ is pressed into the workpiece 4 with a first velocity $v_1$ of $v_1 \geq 1$ m/s, especially with 6 m/s $\leq v_1 \leq 8$ m/s, especially preferably with $v_1 \approx 7$ m/s. In this process, a so-called high-speed shearing occurs, with which an especially smooth surface can be achieved. However, no extrusion can occur herein, due to the high first velocity $v_1$ and the concomitant high impulse. In the following second movement section $B_2$ the second velocity $v_2$ decreases significantly and is preferably <0.5 m/s, especially $\leq 0.15$ m/s, or even especially preferably $v_2 \leq 0.005$ m/s, by which an extrusion of the material 9 displaced by the punch 11 into the recess 8 may occur. The last movement section $B_3$ merely denotes a return of the punch 11 to its starting position.

The punch 11 in the first movement section $B_1$ is pressed into the workpiece 4 by a depth $t_1$ of around 0.01 H$\leq t_1 \leq$ 0.5 H, where H stands for the overall height of the workpiece 4. The punch 11 in this case in the first movement section $B_1$ is pressed into the workpiece 4 preferably less than 10%, that is, $t_1 \leq 0.1$ H. The punch 11 in the first and second movement section $B_1$, $B_2$ is pressed into the workpiece 4 by a total depth $t_{1,2} = t_1 + t_2$ of around 0.8 H $\leq t_{1,2} \leq$ 0.9 H, so that after removing the punch 11 from the blind hole 2 there remains a blind hole bottom 16 with a thickness d of around 0.1 to 0.2 H.

Figure 3:
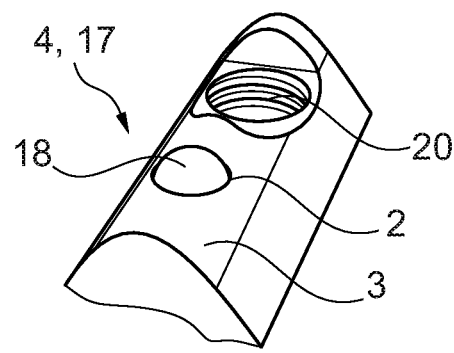

If the workpiece 4 is fashioned for example as a groove block 17 (cf. FIGS. 3 and 4), it may have a height H of around 7.3 mm, an overall depth of the blind hole $t_{1,2}$ of around 6.3 mm, and a blind hole bottom 16 with a thickness d of around 1.0 mm.

Figure 4:
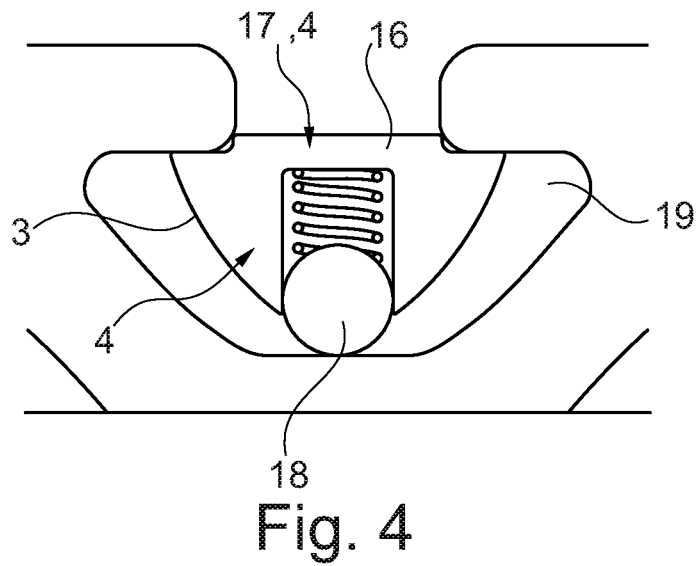

The workpiece 4 produced according to the invention can be, for example, a groove block 17, which receives a spring-loaded fixation element 18 in the blind hole 2 produced according to the invention, by which the groove block 17 can be held in an undercut groove 19 (see FIG. 4). Of course, the groove block 17 may also have, in addition to the blind hole 2, a through opening 20 produced in similar fashion (see FIG. 3), in which an internal thread is cut to receive a fastening screw. Of course, it is also clear that the groove block 17 illustrated need not necessarily have a curved surface 3, but also of course can be fashioned as a rectangular block, or one which is triangular in cross section.

With the method according to the invention and the device 1 according to the invention, an especially exact blind hole 2 can be produced by manufacturing technology and furthermore in an economical way.

The invention claimed is:

1. A method for making a blind hole comprising:
    arranging a metallic workpiece in a negative form structured at least partly complementary to the workpiece with a first portion and a second portion, the first portion of the negative form including a recess configured to receive a material of the workpiece to be displaced, the second portion of the negative form including a guide for a punch wherein a diameter of the recess is equal to or smaller than a diameter of the punch and the recess includes an annular step where the diameter of the recess changes abruptly, and wherein the recess is arranged substantially coaxially to the guide;
    moving the punch in an axial direction in the guide toward the workpiece and establishing a first contact between the punch and the workpiece;
    displacing the material of the workpiece into the recess via pressing the punch into the workpiece;
    pressing the punch into the workpiece, after establishing the first contact, in a first movement section with a first velocity such that the material of the workpiece encountered by the punch in the first movement section is sheared in an adiabatic state;
    further pressing the punch into the workpiece in a second movement section with a second velocity such that the material of the workpiece encountered by the punch in the second movement section is sheared and compacted on one of i) an annular step defined by a difference in the diameters of the recess and the diameter of the punch and ii) the annular step of the recess and is partly extruded into the recess, wherein the second velocity is smaller than the first velocity; and
    moving the first portion relative to the second portion substantially orthogonally to the axial direction and shearing off the material displaced within the recess.

2. The method according to claim 1, wherein the pressing the punch into the workpiece in the first movement section includes pressing the punch into the workpiece to a first depth of approximately 0.01 times a height of the workpiece to 0.5 times the height of the workpiece.

3. The method according to claim 2, wherein the pressing the punch into the workpiece in the second movement section includes pressing the punch into the workpiece to a second depth, the first depth and the second depth defining a total depth of approximately 0.8 times the height of the workpiece to 0.9 times the height of the workpiece.

4. The method according to claim 3, wherein:
    the first velocity is at least 1 m/s; and
    the second velocity is 0.15 m/s or less.

5. The method according to claim 4, wherein:
    the first velocity is approximately 6 m/s to 8 m/s; and
    the second velocity is 0.005 m/s or less.

6. The method according to claim 1, wherein the pressing the punch into the workpiece in the first movement section includes pressing the punch into the workpiece to a first depth, and wherein the pressing the punch into the workpiece in the second movement section includes pressing the punch into the workpiece to a second depth, the first depth and the second depth defining in the first and second movement section a total depth of approximately 0.8 times a height of the workpiece to 0.9 times the height of the workpiece.

7. The method according to claim 1, wherein the pressing the punch into the workpiece in the first movement section includes pressing the punch into the workpiece to a first depth of less than approximately 10% of a height of the workpiece.

8. The method according to claim 1, wherein the first velocity is at least 1 m/s.

9. The method according to claim 8, wherein the first velocity is approximately 6 m/s to 8 m/s.

10. The method according to claim 9, wherein the first velocity is approximately 7 m/s.

11. The method according to claim 8, wherein the second velocity is 0.15 m/s or less.

12. The method according to claim 1, wherein the second velocity is 0.15 m/s or less.

13. The method according to claim 12, wherein the second velocity is 0.005 m/s or less.

14. The method according to claim 1, wherein the establishing a first contact between the punch and the workpiece includes contacting a curved surface of the workpiece with the punch at a point of the curved surface where a tangent of the curved surface is perpendicular to the axial direction.

15. The method according to claim 14, wherein:
    the pressing the punch into the workpiece in the first movement section includes pressing the punch into the workpiece to a first depth of approximately 0.01 times a height of the workpiece to 0.5 times the height of the workpiece; and the pressing the punch into the workpiece in the second movement section includes pressing the punch into the workpiece to a second depth, the first depth and the second depth defining a total depth of approximately 0.8 times the height of the workpiece to 0.9 times the height of the workpiece.

* * * * *